(12) United States Patent
Krause (10) Patent No.: US 10,673,743 B2
(45) Date of Patent: Jun. 2, 2020

(54) SENDING A DATA FLOW (71) Applicant: HEWLETT PACKARD ENTERPRISE DEVELOPMENT LP, Houston, TX (US)

(72) Inventor: Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 63 days.

(21) Appl. No.: 15/114,841

(22) PCT Filed: Jan. 30, 2014

(86) PCT No.: PCT/US2014/013736
§ 371 (c)(1),
(2) Date: Jul. 27, 2016

(87) PCT Pub. No.: WO2015/116079
PCT Pub. Date: Aug. 6, 2015

(65) Prior Publication Data
US 2016/0352616 A1    Dec. 1, 2016

(51) Int. Cl.
*H04L 12/761* (2013.01)
*H04L 12/64* (2006.01)
*H04L 1/16* (2006.01)
*H04L 12/721* (2013.01)
*H04L 12/801* (2013.01)

(52) U.S. Cl.
CPC ............ *H04L 45/16* (2013.01); *H04L 1/16* (2013.01); *H04L 12/6418* (2013.01); *H04L 45/38* (2013.01); *H04L 47/15* (2013.01)

(58) Field of Classification Search
CPC ...... H04L 45/16; H04L 45/38; H04L 12/6418
See application file for complete search history.

(56) References Cited

U.S. PATENT DOCUMENTS 5,566,178 A    10/1996   Butter et al.
6,625,751 B1   9/2003    Starovic et al.
(Continued)

FOREIGN PATENT DOCUMENTS

TW    I416962 B    11/2013
TW    I418229 B    12/2013
(Continued)

OTHER PUBLICATIONS

Shye, A. et al.; "PLR: a Software Approach to Transient Fault Tolerance for Multicore Architectures"; Mar. 19, 2009; 14 pages.
(Continued)

*Primary Examiner* — Kodzovi Acolatse
*Assistant Examiner* — Farhad Ali
(74) *Attorney, Agent, or Firm* — Nolte Intellectual Property Law Group (57) ABSTRACT

A first receiver device receives, from a sender device in a unicast communication, a data flow including a multicast identifier, the multicast identifier indicating that the data flow is to reach multiple receiver devices. The first receiver device determines that the data flow is to reach multiple receiver devices in response to detecting the multicast identifier. The first receiver device sends, to a second receiver device in a unicast communication, the data flow including the multicast identifier.

20 Claims, 3 Drawing Sheets

(56) References Cited

U.S. PATENT DOCUMENTS

| | | | |
|---|---|---|---|
| 6,970,988 B1* | 11/2005 | Chung | G06F 9/3001 |
| | | | 711/104 |
| 8,392,749 B2 | 3/2013 | Callaway et al. | |
| 2002/0069248 A1 | 6/2002 | King et al. | |
| 2007/0016587 A1* | 1/2007 | Ranger | G06F 16/148 |
| 2011/0307574 A1 | 12/2011 | Lipman | |
| 2013/0010698 A1 | 1/2013 | Periyalway et al. | |
| 2013/0208719 A1* | 8/2013 | Aloush | H04L 12/56 |
| | | | 370/390 |
| 2014/0010102 A1 | 1/2014 | Cho et al. | |
| 2015/0319036 A1* | 11/2015 | Zhang | H04L 41/0863 |
| | | | 370/216 |

FOREIGN PATENT DOCUMENTS

| | | |
|---|---|---|
| TW | I419501 B | 12/2013 |
| TW | I420847 B | 12/2013 |
| WO | WO-2013-095355 A1 | 6/2013 |

OTHER PUBLICATIONS

The International Search Report and the Written Opinion of the International Searching Authority dated Oct. 22, 2014; International Application No. PCT/US2014/013736.

* cited by examiner

SENDING A DATA FLOW

BACKGROUND

A system can include multiple devices that can communicate with each other. In some cases, a pair of devices can communicate by using unicast communication, where one device sends data that is received by the other device. In other examples, multicast communication can be used, where one sender device can send data for receipt by multiple receiver devices.

BRIEF DESCRIPTION OF THE DRAWINGS

Some implementations are described with respect to the following figures.

DETAILED DESCRIPTION

In a system that has multiple devices, a sender device can send data to multiple receiver devices. A "device" can refer to any electronic component that is able to communicate over a communications fabric. Examples of devices can include processors, computers, input/output (I/O) devices (e.g. network interface controller, graphics controller, etc.), storage devices, aggregator devices (for aggregating or collecting data), or any other device that is capable of communicating data over a communication path. A communication path can include a wired or wireless link between devices.

In some examples, the sender device can use separate unicast communications to send data in respective transmissions to the multiple receiver devices. Traditionally, to perform such separate unicast communications, the sender device is configured with information about each of the multiple receiver devices that the sender device is to send data to. In a system with a large number of devices, having to configure a sender device with information of all possible receiver devices may not be efficient or practical.

As an alternative to unicast communications, a multicast communication can be employed, in which a sender device can multicast data to multiple receiver devices in a single transmission. This multicast transmission is routed by switches or routers in the communications fabric to respective ones of the multiple receiver devices. Although traditional multicast communications can be more efficient for sending data from a sender device to multiple receiver devices than using separate unicast communications, multicast communications may cause various issues. For example, if not properly regulated, the sending of multicast data by multiple sender devices can trigger congestion across multiple communication paths if utilization of the communication paths is high. Also, a traditional multicast communication may not achieve a target quality-of-service (QoS), such as a goal relating to bandwidth of data communication or latency of data communication. The multicast communication may be routed over communication paths that may be congested or have poor performance, which can lead to reduced bandwidth or increased latency that violates the target QoS.

Figure 1:
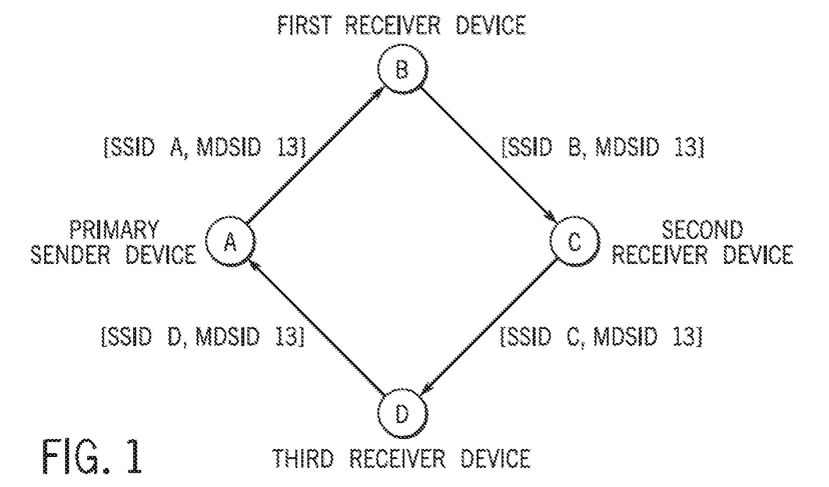
FIG. 1 is a schematic diagram of secondary sender communication in an example arrangement that includes a primary sender device and multiple receiver devices according to some implementations.

In accordance with some implementations, a modified form of multicast communication from a sender device to multiple receiver devices is achieved by using unicast communication between each pair of multiple pairs of devices involved in the multicast communication. As shown in the example of FIG. 1, a sender device A can send data for receipt by multiple receiver devices B, C, and D. In the example of FIG. 1, multiple pairs of devices are present, including pair {A, B}, pair {B, C}, and pair {C, D}. Between each of the foregoing pairs, unicast communication is used, even though the data is sent by the sender device A for receipt by multiple receiver devices B, C, and D. As depicted in FIG. 1, the modified form of the multicast communication is achieved by using a chain of unicast communications between successive pairs of devices.

The sender device A is a "primary" sender device, which can refer to the sender device that initially sends data that is to be communicated to multiple receiver devices. In accordance with some implementations, to enable multicast communication based on use of a chain of unicast communications, a receiver device can become a secondary sender device. The secondary sender device can send data to the next receiver device. The next receiver device can then also become a secondary sender device to further send data to a next, downstream receiver device. This can continue until the last receiver device in the chain receives data associated with the data flow, in which case the last receiver device can send a response indication to the primary sender device.

In some cases, the response indication can include an acknowledgement indication can be a positive acknowledgement (indicating that data associated with the data flow from the primary sender device to the last receiver device was successfully received) or a negative acknowledgement (indicating that data associated with the data flow was not successfully received at some point along the chain). The acknowledgment indication can be an explicit acknowledgment indication or an implicit acknowledgement indication. For example, an implicit acknowledgment indication can be an indication in which the final receiver device simply does not send any acknowledgment back to the primary sender device, where this lack of acknowledgement can be construed by the primary sender device as being a negative acknowledgment.

In addition to or instead of the acknowledgment indication, the last receiver device can send a response indication that includes result data back to the primary sender device. The sending of result data can be implicitly considered a positive acknowledgment.

The modified form of multicast communication that employs a chain of unicast communications between successive pairs of devices, starting at the primary sender device and continuing to multiple receiver devices, can also be referred to as a secondary sender communication. In some implementations, the primary sender device is responsible for tracking completion of the secondary sender communication. In some implementations, a receiver device does not perform tracking of completion of the overall secondary sender communication, but would merely perform any respective processing of received data and forwarding of data to the next receiver device.

The chain of unicast communications transmits a data flow from the sender device (e.g. A in FIG. 1) to successive receiver devices (e.g. B, C, and D in FIG. 1). Data of the data flow that is sent among devices in the chain starting at the primary sender device and ending at the last receiver device can be identical data that is merely replicated from device to device. Alternatively, the data associated with the data flow can include result data produced by processing (e.g. performing a calculation on, performing a modification of, or performing some other operation on) received data. For example, the primary sender device can send data of a data flow to a first receiver device. The first receiver device can produce a result data based on the received data from the primary sender device, and can send the result data to the next receiver device. This result data can be considered to be part of the data flow starting at the primary sender device that is to be communicated to multiple receiver devices.

Use of unicast communications between successive pairs of devices in secondary sender communication can increase hop-by-hop reliability, since unicast communications are usually more reliable than traditional multicast communications. Also, each sender device (either the primary sender device or a secondary sender device) does not have to be configured with information regarding all downstream devices that are to receive a data flow. The primary sender device would only have to be provided information with the first receiver device and the final receiver device (B and D in FIG. 1, for example), and would not have to know about intermediate receiver devices (e.g. C). Each intermediate receiver device (e.g. intermediate receiver device B, C, or D) would only have to be provided information about the next receiver device along the chain of the data flow.

QoS goals can also be managed for each unicast communication between a pair of the devices in the chain, to increase the likelihood that the secondary sender communication achieves QoS goals. Also, unicast communication can be easier to regulate to reduce the possibility of congestion in a system. Also, secondary sender communication allows for scaling across distance as well as size of a system. As additional devices are added to a system, data can be sent to such additional devices by simply extending the secondary sender communication to reach the additional devices.

In some examples, a data flow from a primary sender device to multiple receiver devices can be part of a transaction. A transaction can refer to a unit of operation between or among devices, which can be performed in response to a request or triggered by an event.

In an example with the arrangement of FIG. 1, the primary sender device A can send data of a transaction to the first receiver device B, which can process the transaction (e.g. a write transaction in which data is written to memory, an atomic transaction in which data is read from memory and updated, etc.). After processing the transaction, the first receiver device B can transmit data of the transaction to the second receiver device C, which can also process the transaction. The second receiver device C can repeat the action taken by the first receiver device B or can simply forward the result data produced by the first receiver device B. This process continues until the final receiver device D is reached, in which case the final receiver device can send an acknowledgment indication or a result of the transaction back to the primary sender device A.

Figure 2:
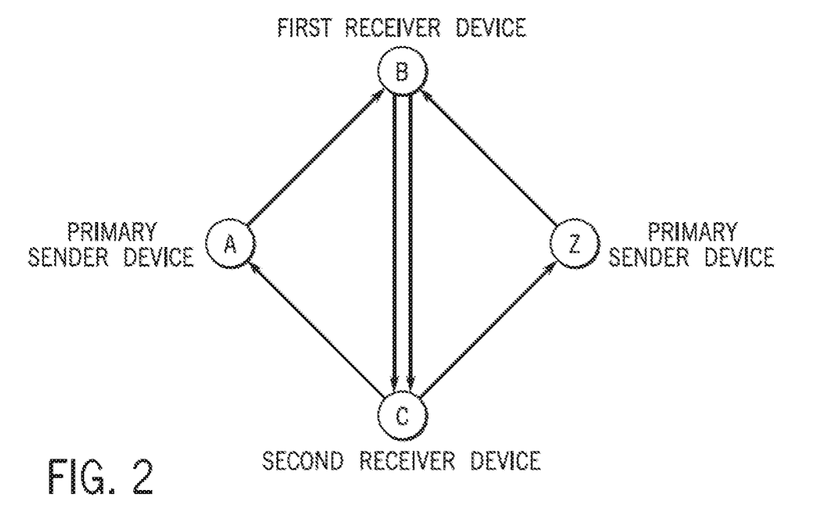
FIG. 2 is a schematic diagram of secondary sender communications in another example arrangement that includes multiple primary sender devices and multiple receiver devices, in accordance with further implementations.

FIG. 2 is a schematic diagram showing an example in which receiver devices are participating in multiple secondary-sender communications. In the example of FIG. 2, there are two primary sender devices (A Z). Each primary sender device (A, Z) sends its respective data flow to the first receiver device B. The first receiver device B can then become a secondary sender device for each of the multiple secondary sender device communications, and can send data of both data flows to the next receiver device C. In the example of FIG. 2, the receiver device C is the final receiver device, which can send an acknowledgment indication or a data result to each respective primary sender device (A, Z).

In accordance with some implementations, a data flow can use a multicast identifier to indicate that the data flow is to reach multiple receiver devices. Such multicast identifier included in a data flow is contrasted with a unicast identifier, which would indicate to a receiver device that the data flow is intended for just one receiver device. The multicast identifier can be in the form of an address, a switching identifier, or some other type of identifier.

In some examples, a switching identifier identifies an endpoint (source or destination) of a data flow (e.g. a transaction) over a communication fabric between devices, where the communication fabric can include one or multiple switches. A source switching identifier (SSID) identifies the source of the data flow, while a destination switching identifier (DSID) identifies the destination of the data flow.

Figure 3:
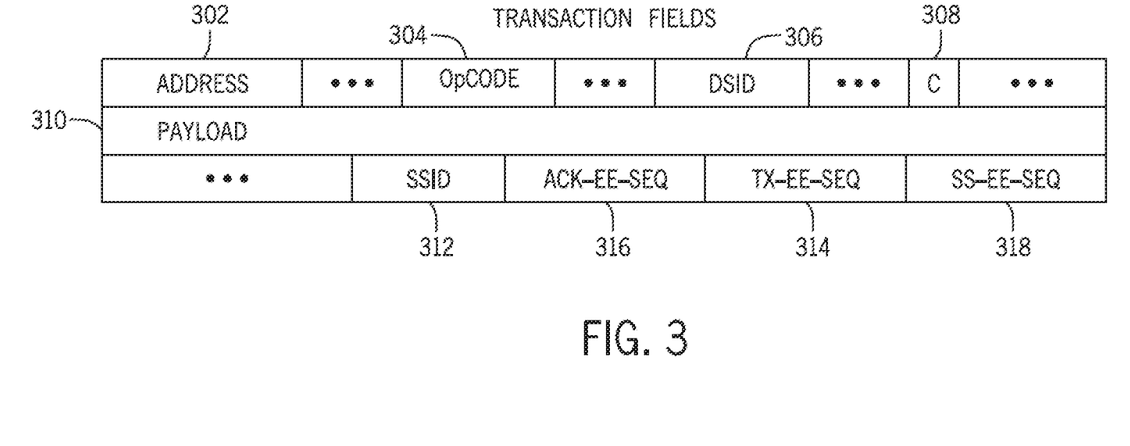
FIG. 3 is a schematic diagram of example protocol fields in control information of a transaction, according to some implementations.

Example fields of a transaction (or other data flow) are depicted in FIG. 3. Although example fields are shown in FIG. 3, it is noted that in other examples, additional or alternative fields for transactions can be employed. An address field 302 specifies an address associated with the transaction. The address can identify a location in memory that contains data for the transaction (note that the transaction can be a read transaction for reading data, a write transaction for writing data, or another type of transaction). An OpCode field 304 includes one of multiple operation codes, which can be used for specifying a specific operation to be performed for the transaction.

A DSID field 306 includes a DSID that identifies a destination of the transaction. A C (cast) field 308 is an indicator for indicating whether the transaction is a multicast transaction or a unicast transaction. If the C field 308 is set to a first value, then the transaction is a unicast transaction. However, if the C field 308 is set to a second, different value, then the transaction is a multicast transaction. If the C field 308 is set to the second value, then the DSID in the DSID field 306 is a multicast identifier. This DSID is also referred to as an MDSID (or multicast DSID).

In other examples, the C field 308 can be omitted. In such examples, DSIDs within a specified range or ranges are interpreted as multicast DSIDs, while other DSIDs are interpreted as unicast DSIDs.

A payload field 310 can carry the payload for the transaction, where the payload can be specific to the operation(s) specified by the OpCode field 304. An SSID field 312 includes an SSID to identify the source of the transaction.

In some examples, sequence numbers can be used for tracking a transaction. A Tx-EE-Seq field 314 contains a sequence number associated with a transmitted transaction. The sequence number can monotonically increase with each new transaction.

An Ack-EE-Seq field 316 includes a sequence number associated with a successfully received transaction (as received by a receiver device). The Ack-EE-Seq field 316 is used for a unicast transaction. If the transaction is a multicast transaction, in which secondary sender communication is employed, then an SS-EE-Seq field 318 includes a sequence number associated with the last successfully received transaction at the last receiver device in the chain for the secondary sender communication.

If a receiver device has successfully received and processed data of a transaction, then the data of the transaction can be forwarded in a unicast communication by the receiver device to the next receiver device. However, if an error is experienced by the receiver device, then one of several error recovery procedures can be used, in some examples.

If the receiver device failed to successfully receive data of a transaction, the receiver device can send a negative acknowledgment to the upstream sender device. The negative acknowledgment can indicate the sequence number of the last transaction that was successfully received by the receiver device. Based on the sequence number, the upstream sender device can retransmit the transaction to allow for recovery of the previously failed transmission.

In other implementations, if a communication failure is experienced between a sender device (e.g. primary sender device or secondary sender device) and a receiver device, path migration between the sender device and the receiver device can be employed. Patti migration refers to migrating from a first path (which may have experienced a fault or other failure) to a second path. To enable path migration, multiple paths are provided between the sender device and the receiver device.

In other examples, in response to detecting an error between a sender device and a receiver device, a new set of participating devices may be identified, where the new set of participating devices can just be a subset of the original participating devices of the secondary sender communication, or a different set of participating devices. The secondary sender communication can then be restarted using the new set of participating devices. This can be performed transparently such that the primary sender device is not aware of the error that has occurred.

As an example, if a particular secondary sender device experienced a failure, a new participating device can be added into the secondary sender communication path to replace the failed secondary sender device. Alternatively, if there are sufficient devices along the path, the failed secondary sender device can be bypassed.

Figure 4:
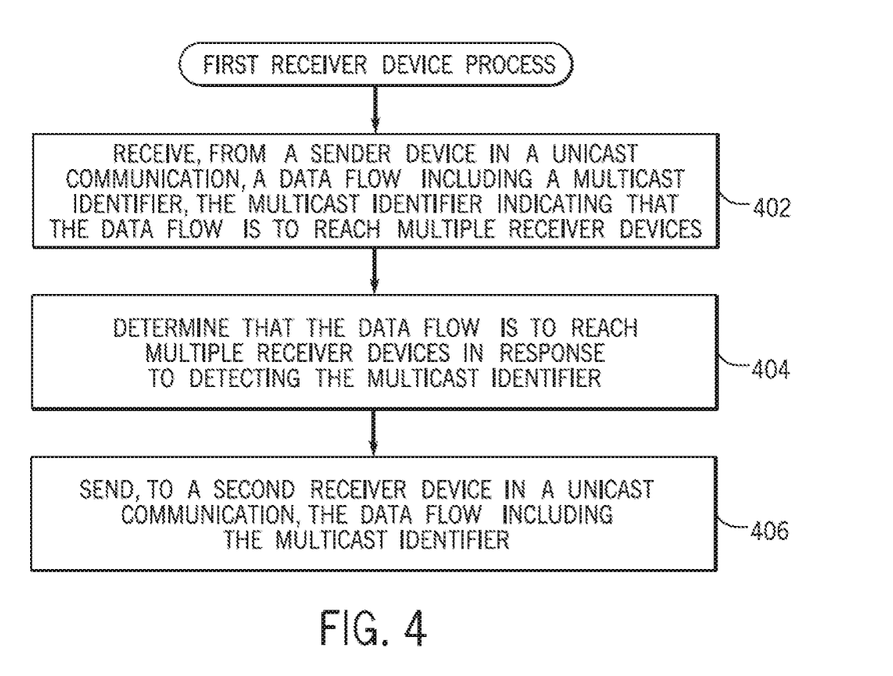
FIG. 4 is a flow diagram of a secondary sender communication process according to some implementations.

FIG. 4 is a flow diagram of a process of performing a secondary sender communication according to some implementations. The process of FIG. 4 can be performed by a receiver device in FIG. 1 or 2, for example. This receiver device is referred to as a "first" receiver device. The "first" receiver device can refer to any receiver device in the chain of the data flow for the secondary sender communication.

The first receiver device receives (at 402), from a sender device in a unicast communication, a data flow including a multicast identifier (e.g. MDSID). The multicast identifier indicates that the data flow is to reach multiple receiver devices. Note that the sender device that sent the data flow to the first receiver device can be a primary sender device, or alternatively, can be a secondary sender device.

The first receiver device determines (at 404) that the data flow is to reach multiple receiver devices in response to detecting the multicast identifier. The first receiver device then sends (at 406), to a second receiver device in a unicast communication, the data flow that includes the multicast identifier.

A receiver device that receives a transaction (or other data flow) from a sender device (either a primary sender device or a secondary sender device) can either be a passive participant or an active participant in the secondary sender communication. If the receiver device is a passive participant, then the receiver device would perform simple transaction forwarding, where the receiver device would just relay the data that was received. Although a passive participant has to be able to detect the multicast identifier (e.g. MDSID), the passive participant does not have to fully implement multicast services and transaction replication (transaction replication refers to creating one or multiple replicas of the transaction). In some implementations, the passive participant can simply map or otherwise associate a multicast identifier with a particular egress interface of the passive participant, so that data of the transaction can be forwarded through the particular egress interface.

If the receiver device is an active participant, then the receiver device acts as a destination of the transaction and performs processing on data of the transaction. The multicast identifier (e.g. MDSID) can be mapped or otherwise associated by the active participant to a particular egress interface. The active participant can also perform transaction validation, transaction ordering, and other tasks, based on the SSID and the MDSID, for example. The active participant can also perform error recovery as would be performed for a unicast transaction. The active participant can also perform reliable delivery, which provides uncorrupted, in-order, exactly-once transaction delivery. In-order delivery can refer to an order of delivery of transactions according to the order that the transactions were transmitted.

Using tuples (SSID, MDSID) of respective pairs of devices, a series of ordering domains can be defined, where the series of ordering domains are unified by a common MDSID. For example, FIG. 1 shows a series of ordering domains including an ordering domain (SSID A, MDSID 13) between primary sender device A and first receiver device B, an ordering domain (SSID B, MDSID 13) between the secondary sender device B and a second receiver device C, an ordering domain (SSID C, MDSID 13) between the secondary sender device C and a third receiver device D. and an ordering domain (SSID D, MDSID 13) between the third receiver device D and the primary sender device A.

The series of ordering domains specify an order in which operations of the transaction associated with the secondary sender communication are to be applied.

Various example use cases are discussed below.

In some examples, simple data replication can be performed. In an example involving a write transaction in the arrangement of FIG. 1, the primary sender device A can transmit a write transaction to receiver device B, which performs the write and then forwards the write transaction to receiver device C. Note that the write transaction can include an OpCode field that specifies the write operation and that data of the write operation is to be replicated.

The receiver device C performs the write and then forwards the write transaction to receiver device D, which performs the write and then sends a write acknowledgment back to the primary sender device A. When the primary sender device A receives the write acknowledgment, the primary sender device A notes the MDSID associated with the write acknowledgment. Since the primary sender device A is the sole initiator of the write transaction, the primary sender device A looks up the associated sequence number in the SS-EE-Seq field, and indicates the write transaction identified by the sequence number as having completed successfully.

If any of receiver devices B, C, or D is unable to perform the write in response to successfully receiving the write transaction, then the receiver device that experienced the error ("faulty receiver device") can generate a new transaction using the same SS-EE-Seq sequence number; however, the OpCode field of the new transaction would specify a transaction failed value. Each downstream receiver device that is downstream of the faulty receiver device can simply relay the transaction including the transaction failed OpCode field to the next receiver device. In response to the transaction failed OpCode field, each downstream receiver device would not perform the write specified by the write transaction.

The last receiver device D forwards the transaction with the transaction failed Opcode field to the primary sender device A. In response to the primary sender device A receiving the transaction including the transaction failed OpCode field, the primary sender device A is able to determine that an error has occurred somewhere along the chain with respect to the transaction identified by the sequence number in the SS-EE-Seq field, and can take appropriate corrective action.

In alternative implementations, the faulty receiver device can enter a discard mode upon detecting an error to ensure that all subsequent transactions (that are subsequent to the transaction that failed at one of the receiver devices) are not performed until the sender device A initiates recovery due to the failed transaction. For example, if the receiver device B in FIG. 1 experienced the error, the receiver device B can enter the discard mode. Each of receiver devices B, C, and D can identify an earlier known good state of data prior to performance of the failed transaction. However, if the receiver device C in FIG. 1 experienced the error, then data at the receiver device B (which may have been modified by the transaction) may not be synchronized with data at each of receiver devices C and D. In this case, the data at the receiver device C or D can be identified as having the known good state (since the transaction has not yet committed at the receiver device C or D). To recover from the error, the primary sender device A can replay operations of the failed transaction, where the replay operations are applied to the data of the known good state at the receiver device C or D. During replay, receiver devices that detect a transaction that they have successfully completed can simply forward to the next hop without re-executing the transaction.

Other example use cases involve performing an atomic transaction with result replication. An atomic transaction refers to a transaction in which data is read, and the read data may be modified. No other requestor can access the data during the atomic transaction. The atomic transaction issued by a primary sender device can include an OpCode field set to a value to indicate the performance of an atomic operation. Result replication refers to replicating the result of the atomic transaction to another device.

In an example using the arrangement of FIG. 1, the primary sender device A can transmit an atomic transaction request (e.g. atomic fetch-and-add request or other atomic request) to the receiver device B. In some examples, the receiver device B may be the only receiver device that supports atomic operations. The receiver device B processes the atomic transaction request and generates a result of the atomic transaction. The atomic transaction result is forwarded by the receiver device B to the receiver device C. In the atomic transaction result sent by the receiver device B to the receiver device C, the associated OpCode field may be set to a value indicating that an atomic transaction result is being sent. In response to detecting the OpCode field set to the value indicating the atomic transaction result, the receiver device C determines that the received data includes the atomic transaction result, which is stored by the receiver device C before the receiver device C forwards the atomic transaction result to the next receiver device D.

The receiver device D similarly stores the atomic transaction result before forwarding the atomic transaction result back to the primary sender device A. Upon receiving the atomic transaction result, the primary sender device A is made aware that the atomic transaction result has been successfully replicated across the receiver devices.

In alternative examples, the receiver device B can forward both the atomic transaction result and the atomic transaction request to the receiver device C. Assuming that the receiver device C is also capable of performing atomic transactions, the receiver device C can perform the requested atomic transaction, which produces an atomic transaction result. The receiver device C compares the produced atomic transaction result with the received atomic transaction result, and can output either a successful result (if the produced atomic transaction result matches the received atomic transaction result) or a failure indication (if the produced atomic transaction result does not match the received atomic transaction result). The failure indication can identify the discrepancy between the produced atomic transaction result and the received atomic transaction result. The failure indication can also include both the produced and received atomic transaction results. The above process can be repeated also at receiver device D. The receiver device D can then provide the successful atomic transaction result to the primary sender device A, or can provide the failure indication to the primary sender device A.

Further example uses cases can involve smart memory operations with result replication across multiple receiver devices. For example, each of the multiple receiver devices can include a smart memory device, where the smart memory device can include computation logic (also referred to as an accelerator) to perform specified computations. When a smart memory device receives a transaction, the smart memory device can apply one or multiple computations on data to produce result data. The result data can be replicated by the smart memory device to a downstream receiver device, which can similarly be another smart memory device. The result data can continue to be replicated until the primary sender device A receives the result data. A smart memory transaction can include an OpCode field that is set to a value indicating that smart memory operation(s) is (are) to be performed by the smart memory device(s).

In some implementations, a smart memory transaction can be transparently or application-visibly triggered through a replicated write request. In other words, a smart memory transaction does not have constrained to a specific operation code in an OpCode field.

In alternative examples, parallel smart memory operations can be launched across multiple smart memory devices. The primary sender device A sends a smart memory transaction (possibly with input data) to a first smart memory device B. In response to determining (such as based on the associated OpCode field that the transaction is a smart memory transaction), the first smart memory device B can initiate one or multiple smart memory operations, and instead of waiting until the smart memory operation(s) is (are) complete, the first smart memory device B forwards the smart memory transaction to the next smart memory device C.

Similarly, the smart memory device C initiates one or multiple smart memory operations, and forwards the transaction request to the smart memory device D. The smart memory device D can in turn forward the smart transaction request back to the primary sender device A, which is now able to determine that all smart memory devices in the chain are working in parallel in performing smart memory operations.

There are various example ways to retrieve result data of the smart memory operations discussed above. In some examples, it is assumed that the smart memory devices B, C, and D are to perform the same smart memory operations, and thus should produce the same result data based on the same input data. The primary sender device A can send a read request to the smart memory device B, which generates a read response that is responsive to the read request. The read response contains the result data of the smart memory operation(s) performed at the smart memory device B.

The smart memory device B sends the read response to the smart memory device C. The smart memory device C can compare the payload of the read response received from the smart memory device B with the result data of the smart memory operation(s) performed at the smart memory device C.

The comparison result can then be sent by the smart memory device C to the smart memory device ID, along with the result data from the smart memory device C. The smart memory device D in turn can perform its comparison of the received result data and the result data produced by the smart memory operation(s) at the smart memory device D. The comparison result at the smart memory device D is then sent to the primary sender device A, which is able to ascertain whether the smart memory operations at smart memory devices B, C, and D produced consistent result data based on the same input data.

In alternative examples, the primary sender device A can send normal unicast read requests to the smart memory devices B, C, and D to retrieve the result data of the smart memory operations at the respective smart memory devices B, C, and D. This approach allows the smart memory devices B, C, and D to execute different smart memory operations and generate different result data from the same input data. This may be useful for parallel processing where each smart memory device performs only a portion of the work.

Figure 5:
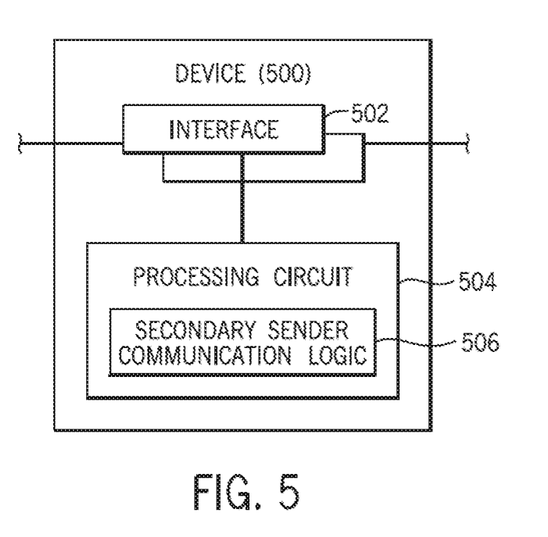
FIG. 5 is a block diagram of a device according to some implementations.

FIG. 5 is a block diagram of an example device 500, which can be a primary sender device or a receiver device that is capable of performing secondary sender communication according to some implementations. The device 500 includes one or multiple interfaces 502 to allow the device 500 to communicate over respective communication paths with other devices.

A processing circuit 504 is coupled to the interface(s) 502. The processing circuit 504 includes a secondary sender communication logic 506 to initiate or handle secondary sender communication according to some implementations. For example, the secondary sender communication logic 506 can perform the tasks of a receiver device according to FIG. 4. Alternatively, the secondary sender communication logic 506 can perform other tasks of a receiver device, or tasks of a primary sender device.

The processing circuit 504 can also perform other computations, such as computations of a smart memory device.

The processing circuit 504 can be implemented in hardware, or can be implemented as a combination of hardware and machine-executable instructions. The instructions can be loaded for execution on the processing circuit 504. The processing circuit 504 can include a microprocessor, microcontroller, processor module or subsystem, programmable integrated circuit, programmable gate array, or another control or computing device.

Data and instructions are stored in respective storage devices, which are implemented as one or multiple non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories, memristor memories, and so forth; magnetic disks such as fixed, floppy and removable disks; other magnetic media including tape optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a first receiver device from a sender device in a unicast communication, a data flow including a multicast identifier and data, the multicast identifier indicating that the data flow is to reach multiple receiver devices;
determining, by the first receiver device, that the data flow is to reach multiple receiver devices in response to detecting the multicast identifier; and
sending, by the first receiver device to a second receiver device in a unicast communication, the data flow including the multicast identifier and the data, wherein the receiving and sending are part of performing replication of data at the first receiver device and the second receiver device, wherein the replication comprises processing a transaction to create at least one first replica of the data at the first receiver device and at least one second replica of the data at the second receiver device that is identical to the at least one first replica, wherein the at least one first replica of the data is written to a first memory at the first receiver device, and the at least one second replica of the data is written to a second memory of the second receiver device.

2. The method of claim 1, wherein sending the data flow by the first receiver device to the second receiver device comprises sending a result produced by the first receiver device in response to a computation performed on data of the data flow received by the first receiver device from the sender device.

3. The method of claim 1, further comprising:
receiving, by the sender device from a given receiver device, a response indication regarding the data flow, the given receiver device being the second receiver device or a receiver device further downstream of the second receiver device, the response indication indicating successful receipt of data of the data flow by the given receiver device.

4. The method of claim 3, wherein the response indication includes a result data produced by computation at the given receiver device.

5. The method of claim 1, wherein receiving the data flow by the first receiver device from the sender device comprises receiving the data flow from the sender device that has received the data flow in a unicast communication from a further upstream sender device.

6. The method of claim 1, wherein the first receiver device includes a smart memory device that is configured to perform a computation on data of the data flow, and wherein sending the data flow comprises sending result data produced by the computation at the smart memory device to the second receiver device.

7. The method of claim 1, further comprising performing error recovery by migrating between different paths between the first receiver device and the second receiver device, or selecting a new set of devices that communicates the data flow.

8. The method of claim 1, further comprising:
performing error detection by receiving, by the sender device from a given receiver device, a response indication regarding the data flow, the given receiver device being the first receiver device or a receiver device further downstream of the first receiver device, the response indication indicating unsuccessful receipt of data of the data flow by the given receiver device.

9. A first receiver device comprising:
at least one interface to a sender device and to a second receiver device; and
a processing circuit to:
receive a transaction from the sender device in a unicast communication, the transaction including a multicast identifier to indicate that data of the transaction is to be received by multiple receiver devices;
act as a destination of the transaction by performing processing on the data of the transaction to produce first result data different than the data;
determine, based on detecting the multicast identifier, that the first result data of the transaction is to be received by multiple receiver devices; and
in response to the determining, send the first result data of the transaction to the second receiver device, the first result data of the transaction sent to the second receiver device along with the multicast identifier for comparison by the second receiver device with second result data produced by the second receiver device performing processing on the data, the second result data being different than the data.

10. The first receiver device of claim 9, wherein the transaction is associated with an operation code specifying a type of operation for the transaction.

11. The first receiver device of claim 10, wherein the operation code is settable to a value to indicate that the type of operation is an atomic operation.

12. The first receiver device of claim 10, wherein the operation code is settable to a value to indicate that the type of operation is a smart memory operation.

13. The first receiver device of claim 9, wherein the multicast identifier includes a switching identifier.

14. The first receiver device of claim 9, wherein the performing of processing on the data of the transaction comprises replicating the data at the first receiver device.

15. The first receiver device of claim 9, wherein the performing of processing on the data of the transaction comprises perform a computation on the data to produce the result data.

16. A system comprising:
a primary sender device; and
a plurality of receiver devices,
wherein the primary sender device is to multicast a data flow to the plurality of receiver devices, the multicasting performed using unicast communications between respective pairs of the primary sender device and the plurality of receiver devices,
wherein a first of the plurality of receiver devices is to:
act as a destination of a transaction by performing processing on the data of the data flow to produce first result data different than the data;
determine, based on a multicast identifier in the data flow received in a unicast communication, that the first result data of the data flow is to be sent to multiple receiver devices, and
in response to the determining, send the first result data of the data flow to a second of the plurality of receiver devices using a unicast communication, and wherein the second of the plurality of receiver devices is to:
act as a destination of the transaction by performing processing on the data of the data flow to produce second result data different than the data; and
compare the second result data to the first result data.

17. The system of claim 16, wherein one of the plurality of receiver devices is to send a response indication to the primary sender device for the data flow, the response indication including at least data of the data flow or an acknowledgment indication indicating success or failure of receipt of the data of the data flow.

18. The system of claim 16 wherein the performing of processing on the data of the data flow comprises replicating the data at the first of the plurality of receiver devices, wherein the replication comprises processing the transaction to create at least one replica of the data at the first of the plurality of receiver devices.

19. The system of claim 16, wherein a given receiver device of the plurality of receiver devices is to transmit to the primary sender device a response indication regarding the data flow, the given receiver device being the second of the plurality of receiver devices or another receiver device of the plurality of receiver devices further downstream of the second of the plurality of receiver devices, the response indication indicating successful receipt of data of the data flow by the given receiver device.

20. The system of claim 19, wherein the response indication includes a result data produced by computation at the given receiver device, or an indication acknowledging success or failure of the data flow.

* * * * *